United States Patent Office 3,261,927
Patented July 19, 1966

3,261,927
ELECTROACOUSTIC TRANSDUCER COMPRISING A MAGNETIC SYSTEM WITH ANNULAR AIR GAP AND A RESONATOR
Walter Paul and Adolf Adam, Munich, Germany, assignors to Siemens & Halske Aktiengesellschaft, Berlin and Munich, Germany, a corporation of Germany
Filed Jan. 22, 1962, Ser. No. 167,838
Claims priority, application Germany, Feb. 10, 1961, S 72,477
10 Claims. (Cl. 179—180)

The invention disclosed herein relates to electroacoustic transducers and is particularly concerned with an electroacoustic transducer comprising a magnetic system with annular air gap and a resonator coupled to the space in back of the membrane.

In previously known transducers of this kind, the resonator is arranged within the transducer housing in back of the pole ring, the border wall of the resonator space which faces the pole ring extending in disk shape from the cylindrical permanent magnet to the laterally disposed housing wall. In this resonator wall are provided the resonator openings.

The construction of a resonator of this kind entails some drawbacks. For example, the resonator wall which faces the pole ring is not sufficiently resistant against axial acceleration forces acting on the transducer. This may lead to a deformation of the annular disk shaped resonator wall or to a shifting of such wall and therewith to an alteration of the resonator frequency. Moreover, such a constructional form of the resonator presupposes that the dimensions of the outer diameter of the cylindrical permanent magnet and of the inner diameter of the transducer housing are faithfully maintained, so as to provide an acoustically tight delineation of the resonator space with respect to the space lying ahead thereof, and to assure that the access to this space is effected only through the resonator openings which are as to the size thereof accurately fixed.

While no difficulties are encountered in keeping the tolerance for the inner diameter of the transducer housing small, the maintaining of the dimensions of the outer diameter of the permanent magnet requires involved and costly operations. The permanent magnet is generally made of sintered material and such magnets are, owing to the peculiarities of the fabrication thereof, obtainable only with dimensions which are spread over a wide range. The requirement of faithfully maintaining the dimensions of the permanent magnet necessitates that it be after the sintering subjected to machining or grinding operations.

Another disadvantage resulting from the structural peculiarities of the known transducer of the initially indicated kind resides in the fact that the resonator openings of the resonator are not anymore accessible after pressing the pole ring in place. If it is found in connection with a completed transducer that the damping of the resonator opening does not correspond to the desired value, which may for example happen when the silk disk covering the resonator opening is partially soiled with cementitious material, there is no possibility to remedy this drawback in simple manner.

It was also found, in connection with the dimensioning of transducers with rearwardly closed housing, for telephone purposes, that the resonator wall which faces the pole ring, must be brought as close as possible to the pole ring so as to obtain a good frequency response. Disturbing transverse currents occur in such cases frequently between the pole ring and the resonator wall.

The problem and object of the present invention, in connection with an electroacoustic transducer with a magnetic system provided with an annular air gap and a resonator coupled to the space in back of the membrane, reside in overcoming the above indicated disadvantages.

According to the invention, this is achieved by the provision of a transducer comprising a resonator of new constructional form; the resonator space or chamber being among others delineated by the pole ring which is provided with at least one resonator opening, and such space is acoustically sealed with respect to the annular air gap by a cylindrical partition wall which extends from the pole ring.

Details of the invention will now be described with reference to the accompanying drawing comprising FIGS. 1 to 4, showing four embodiments thereof.

The embodiments shown in FIGS. 1 to 4 represent respectively, in cross-sectional views, only the parts which are of interest in connection with the present invention, namely, the magnet system of the electroacoustic transducer provided with an annular air gap.

FIG. 1 shows the permanent magnet 1, the pole plate 2, the pole ring 3, the side wall 4 of the housing as well as the bottom wall 5, of an electroacoustic transducer with a magnet system forming an annular air gap, such parts being disposed in known mutual relationship. Between the pole plate 2 and the pole ring 3 extends the annular air gap 6. Into this air gap dips the oscillating coil (not shown) of the transducer, which coil is fastened to the membrane (likewise omitted). The resonator walls are in the prior arrangement formed by the side wall 4 and the bottom wall 5 of the housing as well as by the outer wall of the permanent magnet 1 and a resonator wall extending between the outer wall of the permanent magnet 1 and the housing wall 4, defined resonator openings being formed in such resonator wall. This last named wall delimits the resonator volume or space laterally toward the pole ring. The openings in this wall effect the coupling of the resonator to the volume or space in back of the membrane. In order to avoid further undesired resonance effects, the pole ring is provided with a plurality of sufficiently large openings which combine the space between the membrane and the pole ring and the space between the pole ring and the resonator wall to form an acoustically uniformly operating space.

In the constructional form of the resonator space according to the present invention, as shown in connection with the embodiment illustrated in FIG. 1, the pole ring 3 of the magnet system forms as such one wall of the resonator, openings being provided in such pole ring 3, one such resonator opening 7 with the damping disk or foil 8 being indicated in FIG. 1. The resonator space is shielded with respect to the annular air gap by an annular or ring-shaped acoustically tight partition wall 9. This partition wall 9 may extend, for example, from the pole ring 3 to the permanent magnet 1 or it may be formed, as shown in FIG. 1, by a cylindrical tubular member which extends from the pole ring 3 to the bottom wall 5 of the housing, or to an annular disk shaped intermediate bottom, such partition wall having inner dimensions equal to or larger than the inner dimensions of the pole ring. It will be readily seen that the dimensions of the cylindrical permanent magnet have, in such constructional form of the resonator space, no affect on the tightness of the resonator space. The cylindrical surface of the permanent magnet 1 need not be machined in the arrangement according to the invention.

The position of the partition wall made in the form of a cylindrical tubular member, may be secured, for example, by an annular notch 10 formed in the bottom wall 5 of the housing, as indicated in FIG. 1.

The position of the cylindrical partition wall 9 may also be secured by a ring shaped rib 11, as shown in FIG. 2, or by a centering extension 12, as indicated in FIG. 3. The two first noted possibilities for centering the cylindrical partition wall 9 are suitable for partition walls made of metallic material as well as partition walls made of synthetic elastic material, while the last noted possibility is particularly adapted for a partition wall made of elastic synthetic material. Such latter material has generally a resilience great enough to effect, even in the case of great tolerance of the outer diameter of the permanent magnet, proper centering with respect thereto.

FIG. 2 shows, in addition to the centering possibility for the cylindrical partition wall, a possibility for the construction of the resonator openings. A bushing 13 made of synthetic material is pressed into the circular opening 7 of the pole ring 3, the inner diameter and the length of such bushing determining the acoustically effective size of the resonator opening. The bushing is provided with a flange 14 upon which is cemented an acoustic damping material in the form of a silk disk 15. Such a construction of the resonator opening permits in simple manner, after pressing the pole ring in position, variation of the resonance frequency of the resonator and the effect of this resonance within the electroacoustic transducer.

Figure 1:
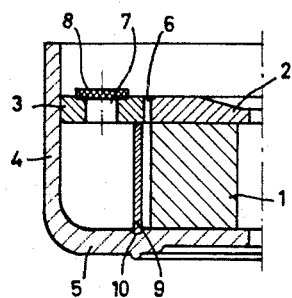
Figure 2:
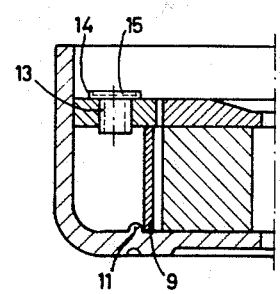
Figure 3:
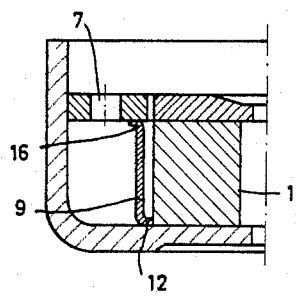
FIG. 3 shows an embodiment employing a cylindrical partition wall 9 made of elastic synthetic material, such wall being acoustically tight and centered in simple manner by means of an extension such as 12 or 16 at one or both ends thereof.
Figure 4:
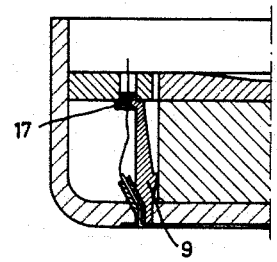
FIG. 4 illustrates an embodiment according to the invention, in which the annular partition wall 9 is likewise made of elastic synthetic material, employing a special bead 17 which permits extension of the contact wire for the oscillating coil in acoustically tight manner.

Changes may be made within the scope and spirit of the appended claims which define what is believed to be new and desired to have protected by Letters Patent.

We claim:

1. An electroacoustic transducer, comprising a magnet system having a bottom wall, side walls, a central magnet of inexact diameter, and an annular pole ring concentric with the magnet and disposed parallel with the bottom wall, with the inner edge of said ring defining an edge of an annular air gap, a partition wall disposed concentrically about said magnet and, with said walls and said pole ring, defining a single resonator space of exact radial dimension independent of the magnet diameter, said resonator space being separated and acoustically sealed from the air gap and said magnet by said partition wall, said pole ring having at least one resonator opening formed therein.

2. An electroacoustic transducer according to claim 1, comprising, disposed within said resonator opening, a tubular bushing made of synthetic material, the inner diameter and the length of said bushing determining the acoustically effective size of the resonator opening.

3. An electroacoustic transducer according to claim 1, wherein said cylindrical partition wall is made of elastic synthetic material.

4. An electroacoustic transducer according to claim 1, wherein said cylindrical partition wall is made of elastic synthetic material, a sealing lip being formed at least at one end of said partition wall.

5. An electroacoustic transducer according to claim 1, said cylindrical partition wall being made of elastic synthetic material, a sealing lip being formed at the end of said partition wall which faces the bottom wall of said housing, said sealing lip centering said partition wall in accordance with the outer diameter of said permanent magnet.

6. An electroacoustic transducer according to claim 1, said cylindrical partition wall being made in the form of a generally cylindrical tubular member, the opposite ends of said member engaging respectively the pole ring and the bottom wall of the housing, the inner dimensions of said partition wall being at least equal to the inner dimensions of the pole ring.

7. An electroacoustic transducer according to claim 1, said cylindrical partition wall being made in the form of a generally cylindrical tubular member, the opposite ends of said member engaging respectively the pole ring and the bottom wall of the housing, the inner dimensions of said partition wall being at least equal to the inner dimensions of the pole ring, a sealing lip being formed at the end of said partition wall which faces the bottom wall of said housing, said sealing lip centering said partition wall in accordance with the outer diameter of said permanent magnet.

8. An electroacoustic transducer according to claim 1, said cylindrical partition wall being made in the form of a generally cylindrical tubular member, the opposite ends of said member engaging respectively the pole ring and the bottom wall of the housing, the inner dimensions of said partition wall being at least equal to the inner dimensions of the pole ring, a notch being formed in at least one of the parts engaged respectively by the opposite ends of said partition wall, for centering said partition wall.

9. An electroacoustic transducer according to claim 1, said cylindrical partition wall being made in the form of a generally cylindrical tubular member, the opposite ends of said member engaging respectively the pole ring and the bottom wall of the housing, the inner dimensions of said partition wall being at least equal to the inner dimensions of the pole ring, an annular rib being formed in at least one of the parts engaged respectively by the opposite ends of said partition wall, for centering said partition wall.

10. An electroacoustic transducer according to claim 1, wherein said partition wall is made of elastic synthetic material, said partition wall comprising at least one acoustically tight lead-through for a contact wire.

References Cited by the Examiner
UNITED STATES PATENTS

| | | | |
|---|---|---|---|
| 1,964,606 | 6/1934 | Thuras | 179—115.5 |
| 2,252,846 | 8/1941 | Giannini et al. | 179—180 |
| 2,489,862 | 11/1949 | Cook | 179—180 |
| 2,852,627 | 9/1958 | Schenkel | 179—180 |

KATHLEEN H. CLAFFY, *Primary Examiner.*

WALTER L. LYNDE, *Examiner.*

S. H. BOYER, *Assistant Examiner.*